United States Patent Office 3,152,490
Patented Oct. 13, 1964

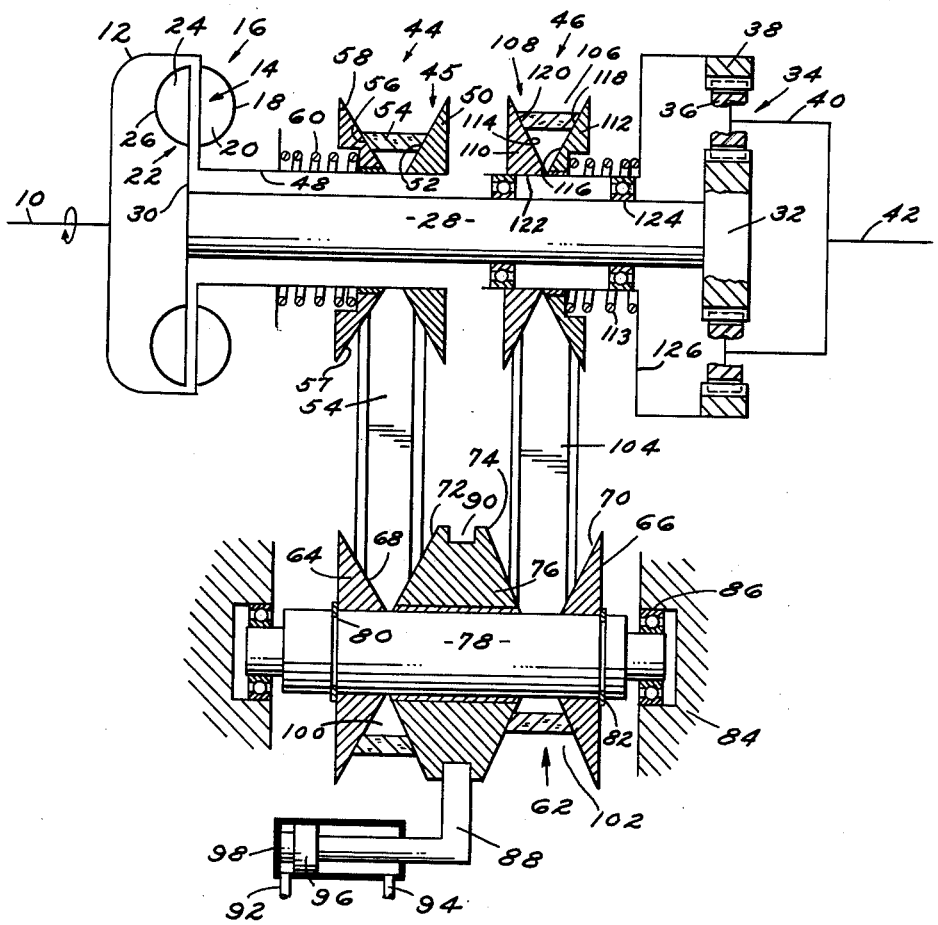

3,152,490
INFINITELY VARIABLE DRIVE TRANSMISSION
George E. Lemieux, Dearborn, Mich., assignor to Ford Motor Company, Dearborn, Mich., a corporation of Delaware
Filed Nov. 13, 1962, Ser. No. 236,975
8 Claims. (Cl. 74—688)

This invention relates to an infinitely variable transmission for use preferably in motor vehicles. More particularly, it relates to an automatic transmission having a split torque power path from a power shaft to a gear set including a belt drive providing infinitely variable speed ratio changes therebetween.

It is therefore an object of the invention to provide an infinitely variable automatic transmission construction.

It is also an object of the invention to provide an automatic transmission having a split torque power path from an engine to a gear set, one path including a variable speed belt drive providing infinitely variable speed ratio changes.

It is a further object of the invention to provide a transmission combining the advantages of a hydrodynamic drive device, a pair of serially arranged variable speed belt drives, and a differentially driven planetary gear set in a manner producing a simplified, infinitely variable automatic transmission that is economical to manufacture.

Other objects, features and advantages of the invention will become apparent upon reference to the succeeding detailed description thereof, and to the drawing illustrating schematically the preferred embodiment thereof.

The figure shows a transmission having a power input shaft 10 adapted to be driven by the output shaft of an engine (not shown) such as, for example, the internal combustion engine for a motor vehicle. Shaft 10 is connected by a shell member 12 to the rotatable impeller or pump 14 of a fluid coupling 16. Pump 14 has a semi-toroidal outer shroud 18 to which are secured dish-shaped blades 20. The pump faces a turbine member 22 having similarly shaped blades 24 secured within an outer shroud 26. The shrouds together define a toroidal path for the circulation of fluid from the pump to the turbine and back again in a known manner to transmit torque therebetween smoothly and efficiently.

Turbine 22 is drive connected to one end of a shaft 28 by flange means 30. Fixedly mounted on the opposite end of the shaft is a sun gear 32 of a simple planetary gear set 34. The gear set has a number of pinions 36 (only one shown) meshing with sun gear 32 and a ring or annulus gear 38, the pinions being rotatably supported upon a carrier member 40. The carrier is connected directly to the power output shaft 42.

The gear set is differentially driven by both the sun and ring gears imparting a driving torque to the gear set to produce a compound rotation of carrier 40. As stated above, sun gear 32 is driven at the speed of turbine 22. Ring gear 38 is adapted to be driven by the pump or impeller 14 through a pair of serially connected variable speed belt drives 44 and 46.

The belt drives are variably adjustable in inverse proportion to each other to produce infinitely variable changes in the speed of the ring gear with respect to pump 14 from an underdrive to an overdrive, as desired. An underdrive of the ring gear produces a range of forward reduction drives of carrier 42 by the gear set, an overdrive of the ring gear producing a range of overdrives of the carrier. Drive of the ring gear at the speed of turbine 22 locks up the gear set to rotate shaft 42 directly at the speed of shaft 28.

As shown, the hub of impeller 14 is secured to one end of a sleeve shaft 48, the opposite end of which fixedly mounts the V-sectioned driving disc 50 of pulley assembly 45. The internal face of disc 50 is conically tapered or beveled for frictionally driving the mating edge 52 of an endless belt 54. The opposite edge 56 of the belt frictionally bears against the beveled face 57 of a driven pulley disc 58 rotatably and slidably journaled on shaft 48. A spring 60 bearing against disc 58 constantly loads the discs and belt together.

The counterpart pulley assembly 62 consists of two outer V-sectioned discs 64 and 66 with internal beveled faces 68 and 70 cooperating with oppositely beveled face portions 72 and 74 on a common central pulley section 76. The discs 64 and 66 are of the same diameter and are fixed to a shaft 78. Snap rings 80 and 82 axially locate the discs on the shaft, which is rotatably mounted in the transmission housing 84 on bearings 86.

The central pulley section 76 is slidably and rotatably mounted on shaft 78 and moved axially by a lever 88 engaged in a groove 90. The lever is reciprocated by fluid pressure supplied selectively through lines 92 and 94 to opposite sides of a piston 96 in a cylinder 98.

The V-shaped grooves 100 and 102 defined by the pulley sections receive the belt 54 and an endless belt 104. Axial adjustment of section 76 in either direction varies the drive ratio between the belts in inverse proportion to each other by varying the pulley effective pitch diameters, as will be described in more detail later.

The opposite portion of belt 104 is received within a groove 106 in a pulley assembly 108. The assembly has V-sectioned driving and driven discs 110 and 112 with internal beveled surfaces 114 and 116 mating with the beveled edges 118 and 120 of belt 104. Disc 110 is fixed to a sleeve shaft 122 rotatably mounted on shaft 28 on bearings 124. The sleeve shaft is drive connected to ring gear 38 by a flange 126 and rotatably and slidably supports the disc 112. Disc 112 is moved axially by a spring 113 to load the belt 104 into driving engagement with disc 110.

In operation, pulley section 76 is initially moved to the position shown forcing belt 54 to its outermost location in groove 100, the disc 58 moving axially to the left against spring 60 to permit this adjustment. Thus, the pulley assembly 45 has decreased its effective pitch diameter while the left hand portion of pulley assembly 62 has increased its effective diameter. Simultaneously, the pulley assembly 108 has increased its effective pitch diameter while the right hand portion of pulley assembly 62 has decreased its effective diameter. That is, the axial movement of section 76 to the left has decreased the effective diameter of belt 104 on pulley assembly 62 while increasing the effective diameter on pulley assembly 108 by adjustment of disc 112 against spring 113. The drive ratios of the belts are therefore changed in inverse proportion to each other and in the positions indicated condition ring gear 38 for the lowest underdrive with respect to the speed of pump 14.

Movement of section 76 to the right from the position shown will progressively vary the effective diameters of the belts on the respective pulleys so as to progressively increase the speed of ring gear 38 with respect to that of pump 14 and sun gear 32. Thus, the ring gear will pass from its lowest speed range wherein it is underdriven with respect to the speed of sun gear 32, through a point where they are rotating at the same speed, to a maximum when the ring gear is overdriven, such as would be the case when the hub of pulley section 76 is abutting disc 66. Thus, the planetary gear set will initially be conditioned for a reduction drive of carrier 40 with respect to the speed of input shaft 10, and will be changed in infinite steps through a direct drive range into an overdrive of carrier 40 upon progressive movement of pulley section 76.

More specifically, the initial slower forward rotation of ring gear 38 as compared to the speed of sun gear 32 causes the ring gear to act as a reaction member for the gear set. The planet pinions 36 therefore walk around within the ring gear to drive carrier 40 at a speed between those of the sun and ring gears. As the underspeed differential decreases upon adjustment of pulley section 76 to the right, the speed of carrier 40 increases until it is equal to that of turbine shaft 28. From this point on, further movement of pulley section 76 to the right overdrives ring gear 38 changing the primary reaction to the sun gear. Carrier 40 is therefore driven at speeds faster than that of turbine shaft 28. Further increases in the overdrive speed differential further overdrives the carrier 42 to a maximum when pulley section 76 contacts disc 66.

Thus, it will be seen that for a constant speed of input shaft 10, the output shaft 42 can be driven at any number of underdrive or overdrive speeds in the same direction, or at the same speed, simply by the adjustment of pulley section 76 by lever 88. Varying the speed of input shaft 10, as is its normal operation, will provide other infinitely variable ranges of drive of the output shaft.

It should be noted that supply of fluid to move piston 96 can be controlled automatically by a control system, not shown, in accordance with changes in vehicle speed or any other parameter, or can be controlled manually.

It should also be noted that a suitable selectively operable reversing mechanism (not shown) would be connected to shaft 42 so as to permit rotation of the mechanism to be driven, such as the vehicle wheels, in a direction opposite to that of shaft 42, when desired.

Thus, it will be seen that the invention provides a torque transmitting means providing infinitely variable changes in the speed of the power output shaft with respect to the power input shaft between underdrive and overdrive ratios. It will also be seen that the invention provides a transmission having a split torque power path from a hydrodynamic drive device to a planetary gear set including serially connected variable speed belt drive mechanisms conditioning the gear set for an infinite number of underdrive or overdrive speed ratios as well as a direct drive. Thus, the invention provides infinite control of the differential in speeds between a driving and driven shaft.

While the invention has been illustrated in its preferred embodiment, it will be clear to those skilled in the arts to which the invention pertains that many changes and modifications may be made thereto without departing from the scope of the invention.

I claim:

1. An infinitely variable speed transmission having input and output shafts and means connecting said shafts for providing progressive and infinitely variable changes in speed ratios therebetween, said means including a hydrodynamic drive device and a gear set, said gear set having a plurality of drive members and other rotatable members including a driven member, means connecting said driven member to said output shaft, means connecting said drive device to said input shaft, means connecting said drive members to said drive device in a plurality of different paths, one of said paths connecting said drive device directly to one of said drive members, another of said paths including an infinitely variable speed belt drive, and means to vary the speed ratio of said belt drive.

2. An infinitely variable speed transmission having input and output shafts and means connecting said shafts for providing progressive and infinitely variable changes in speed ratios therebetween, said means including a hydrodynamic drive device and a gear set, said drive device including a rotatable pump member connected to said input shaft and a rotatable turbine member, said gear set having a plurality of drive members and other rotatable members including a driven member, means connecting said driven member to said output shaft, means connecting said drive members to said pump and turbine members in different paths, one of said paths connecting a member of said drive device directly to one of said drive members, another of said paths including an infinitely variable speed belt drive, and means to vary the speed ratio of said belt drive.

3. An infinitely variable speed transmission having input and output shafts and means connecting said shafts for providing progressive and infinitely variable changes in speed ratios therebetween, said means including a fluid coupling and a gear set, said fluid coupling having a rotatable pump member connected to said input shaft and a rotatable turbine member, said gear set having a plurality of drive members and other rotatable members including a driven member, means connecting said driven member to said output shaft, means connecting said drive members to said pump and turbine members in different paths, one of said paths connecting a member of said coupling directly to one of said drive members, another of said paths including an infinitely variable speed belt drive, and means to vary the speed ratio of said belt drive.

4. An infinitely variable speed transmission having input and output shafts and means connecting said shafts for providing progressive and infinitely variable changes in speed ratios therebetween, said means including a fluid coupling and a gear set, said coupling having a rotatable pump member connected to said input shaft and a rotatable turbine member, said gear set having a plurality of drive members and other rotatable members including a driven member, means connecting said driven member to said output shaft, means connecting said drive members to said pump and turbine members in different paths, one of said paths connecting one of said coupling members directly to one of said drive members, another of said paths including a pair of infinitely variable speed belt drives in series relationship, and means to vary the speed ratio of said belt drive.

5. An infinitely variable speed transmission having input and output shafts and means connecting said shafts for providing progressive and infinitely variable changes in speed ratios therebetween, said means including a fluid coupling and a gear set, said coupling having a rotatable pump member connected to said input shaft and a rotatable turbine member, said gear set having a plurality of drive members and other rotatable members including a driven member, means connecting said driven member to said output shaft, means connecting said drive members to said pump and turbine members in different paths, one of said paths connecting one of said coupling members directly to one of said drive members, another of said paths including a pair of infinitely variable speed belt drives in series relationship, and means to vary the speed ratio of said belt drive, said latter means including a common central pulley assembly between said belt drives having a common adjustable pulley section for varying the drive of said pair of belt drives in inverse proportion to each other.

6. An infinitely variable speed transmission having input and output shafts and means connecting said shafts for providing progressive and infinitely variable changes in speed ratios therebetween, said means including a fluid coupling having pump and turbine members and a planetary gear set having sun and pinion and ring gears and a carrier member, means operably connecting said pump member to said input shaft and to one of said sun and ring gears, means connecting the other of said sun and ring gears directly to said turbine member, means connecting said carrier member to said output shaft, the means connecting said pump member to one of said gears including a pair of serially related infinitely variable speed belt drives, and means to vary the speed ratio of said belt drive, said latter means including a common pulley assembly between said belt drives having an adjustable pulley section movable for varying the drive of said belt drives in inverse proportion to each other.

7. An infinitely variable speed transmission having input and output shafts and means connecting said shafts for providing progressive and infinitely variable changes in speed ratios therebetween, said means including a hydrodynamic drive device and a gear set, said gear set having a plurality of drive members and other rotatable members including a driven member, means connecting said driven member to said output shaft, means connecting said drive device to said input shaft, means connecting said drive members to said drive device in a plurality of different paths, one of said paths connecting said drive device directly to one of said drive members, another of said paths including an infinitely variable speed friction drive mechanism, and means to vary the speed ratio of said friction drive mechanism.

8. An infinitely variable speed transmission having input and output shafts and means connecting said shafts for providing progressive and infinitely variable changes in speed ratios therebetween, said means including a fluid coupling and a gear set, said coupling having a rotatable pump member connected to said input shaft and a rotatable turbine member, said gear set having a plurality of drive members and other rotatable members including a driven member, means connecting said driven member to said output shaft, means connecting said drive members to said pump and turbine members in different paths, one of said paths connecting one of said coupling members directly to one of said drive members, another of said paths including a pair of infinitely variable speed belt drives in series relationship, said belt drives together including axially aligned and spaced power input and output pulley sections, a countershaft, and an adjustable rotatable central pulley assembly common to said input and output pulley sections and mounted on said countershaft, the adjustment of said central pulley assembly varying the drive of said pair of belt drives in inverse proportion to each other.

References Cited in the file of this patent
FOREIGN PATENTS
700,783    Great Britain _____ Dec. 9, 1953